United States Patent
Bhagwat

(10) Patent No.: US 10,425,237 B1
(45) Date of Patent: *Sep. 24, 2019

(54) TERMINATION FOR WIRE PAIR CARRYING DC AND DIFFERENTIAL SIGNALS

(71) Applicant: Linear Technology Holding LLC, Norwood, MA (US)

(72) Inventor: Gitesh Bhagwat, Santa Barbara, CA (US)

(73) Assignee: LINEAR TECHNOLOGY HOLDING LLC, Norwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,843

(22) Filed: Sep. 10, 2018

Related U.S. Application Data

(63) Continuation-in-part of application No. 16/016,301, filed on Jun. 22, 2018.

(60) Provisional application No. 62/643,390, filed on Mar. 15, 2018.

(51) Int. Cl.
*H04L 12/10* (2006.01)

(52) U.S. Cl.
CPC .................... *H04L 12/10* (2013.01)

(58) Field of Classification Search
CPC . H04L 12/10; H02M 1/126; H02M 2001/123; H04B 3/548
USPC ......................................................... 375/219
See application file for complete search history.

(56) References Cited

U.S. PATENT DOCUMENTS

| | | | |
|---|---|---|---|
| 6,492,880 B1 | 12/2002 | Chiappe et al. |
| 7,924,579 B2 | 4/2011 | Arduini |
| 10,148,447 B1 | 12/2018 | Rajagopal et al. |
| 2005/0057276 A1 | 3/2005 | Washburn et al. |
| 2015/0145324 A1 | 5/2015 | Heath et al. |
| 2015/0295735 A1 | 10/2015 | Gardner |
| 2015/0333935 A1 | 11/2015 | Gardner et al. |
| 2016/0054777 A1 | 2/2016 | Dwelley et al. |
| 2016/0142217 A1 | 5/2016 | Gardner et al. |
| 2016/0156173 A1 | 6/2016 | Gardner et al. |
| 2016/0308683 A1 | 10/2016 | Pischl et al. |
| 2016/0337138 A1 | 11/2016 | Gardner et al. |
| 2017/0187472 A1 | 6/2017 | Chini et al. |
| 2018/0024620 A1 | 1/2018 | Gardner |
| 2018/0026525 A1 | 1/2018 | Gardner |
| 2018/0254931 A1 | 9/2018 | Gardner |

*Primary Examiner* — Juan A Torres
(74) *Attorney, Agent, or Firm* — Patent Law Group LLP; Brian D. Ogonowsky

(57) ABSTRACT

A PHY is coupled across a primary winding of an isolation transformer for differential data transmission and reception between PHYs and for DC isolation. Positive and negative low impedance terminals of a DC power supply are coupled to first and second secondary windings of the transformer as split center taps of the transformer. Respective ends of the wires in the wire pair are coupled to the other ends of the secondary windings. Therefore, the power supply conducts DC current through the secondary windings, while the differential data signals also flow through the secondary windings, generating corresponding differential data signals at the inputs to the PHY. The transformer also attenuates common mode noise. Therefore, the circuit makes multi-use of the isolation transformer, allowing fewer components to be used for the DC coupling, wire termination, and common mode noise cancellation.

21 Claims, 4 Drawing Sheets

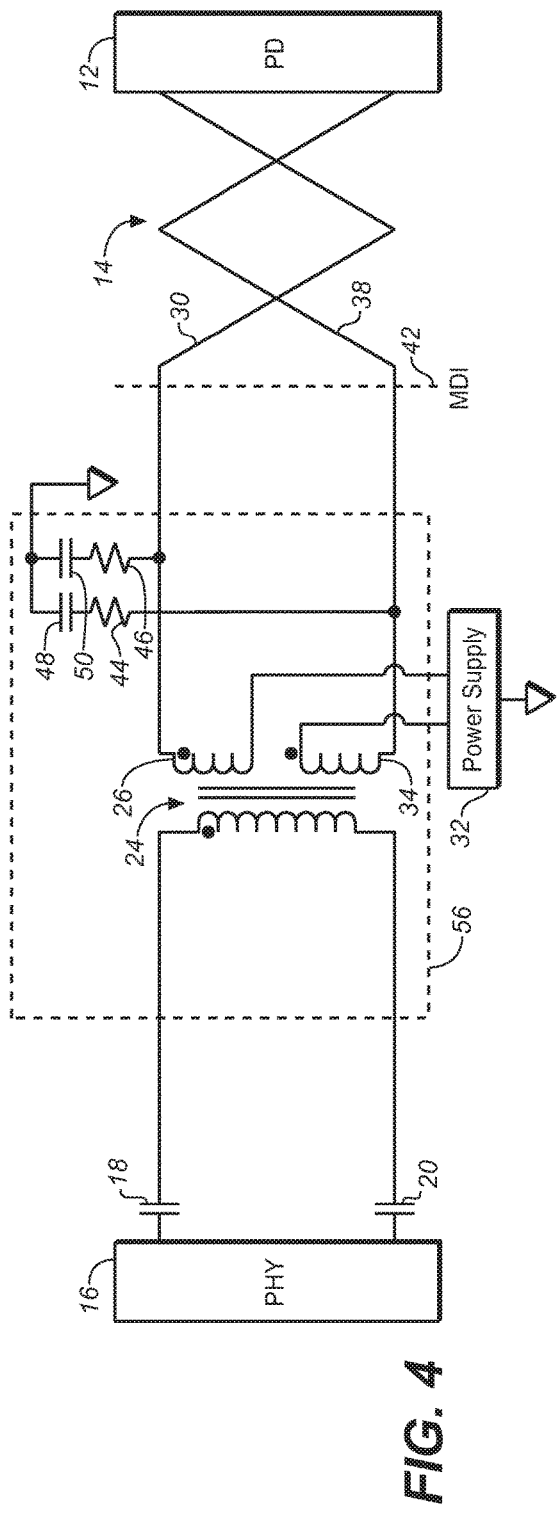
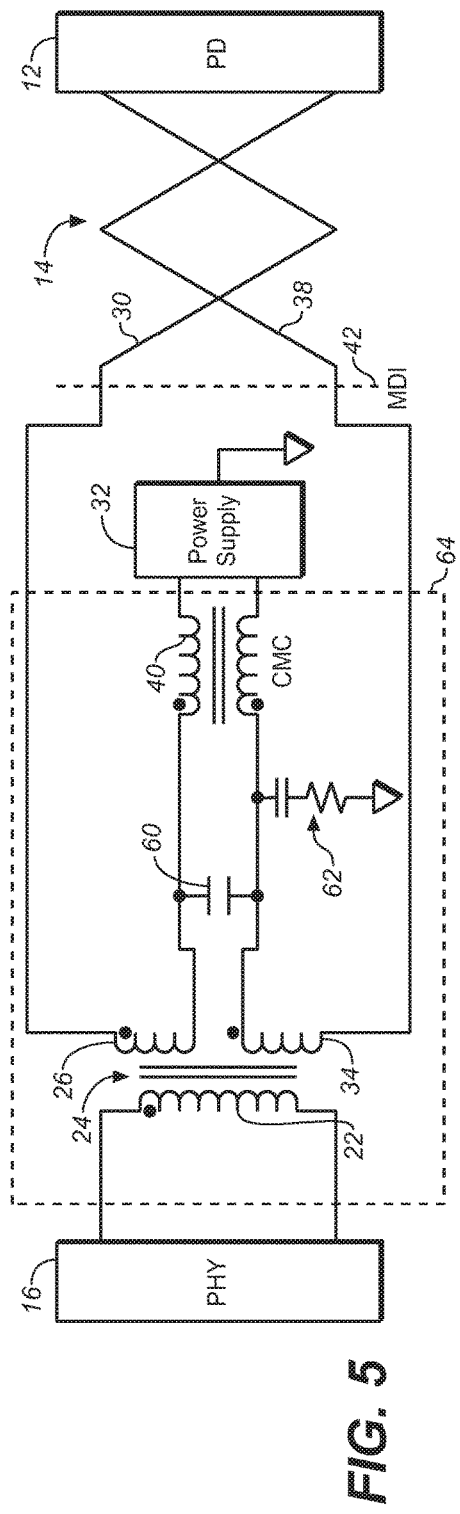
FIG. 4
FIG. 5

TERMINATION FOR WIRE PAIR CARRYING DC AND DIFFERENTIAL SIGNALS

CROSS-REFERENCE TO RELATED APPLICATIONS

This application is a continuation-in-part of U.S. application Ser. No. 16/016,301, filed Jun. 22, 2018, which is based on and claims priority from U.S. Provisional Patent Application Ser. No. 62/643,390, filed Mar. 15, 2018, by Gitesh Bhagwat, incorporated herein by reference.

FIELD OF THE INVENTION

This invention relates to communication systems conducting differential data and DC power over a twisted wire pair and, in particular, to a technique using a center tap isolation transformer for coupling DC power to the wire pair.

BACKGROUND

Many ways have been disclosed for coupling DC power and differential signals to a twisted wire pair. The DC power is used to power equipment connected to the other end of the wire pair, while the differential data allows the equipment at both ends of the wire pair to communicate with each other. Such a system is sometimes referred to as a Power over Data Lines (PoDL) system.

The various termination components should present a low differential data insertion loss, a high common mode noise insertion loss, and a high differential mode return loss (incident power/reflected power). US Publication 2018/0026525, assigned to the present assignee, describes various termination techniques and can provide more background information. FIG. 1 is reproduced from US Publication 2018/0026525.

In FIG. 1, a media dependent interface (MDI) connector 160 is coupled to a twisted wire pair (not shown) carrying both differential data and a DC voltage. The coupling for both ends of the PoDL system may be identical, except that the Powered Device side does not have its own power supply.

A PHY 150 outputs differential data and receives differential data via the MDI connector 160, a common mode choke (CMC) 210, and AC coupling capacitors C1 and C2. The CMC 210 attenuates common mode RF noise from the wire pair. PHY 150 represents the physical layer in the OSI model and is a transceiver that typically includes signal conditioning and decoding circuitry for presenting bits to the next stage. The term PHY is a term of art and is defined by various IEEE standards, depending on the particular application. The PHY is typically an integrated circuit. A digital processor (not shown) is coupled to the PHY 150 for processing the data.

Since the circuit of FIG. 1 is on the Power Sourcing Equipment (PSE) side, DC voltage from a power source 140 is coupled to the wires by separate inductors 142. The inductors 142 block AC and pass DC.

The wires from the MDI connector 160 are terminated by resistors R1 and R2 and capacitors C3 and C4 to minimize reflections.

In a PoDL system, the PHY must be protected from the DC power. Further, common mode RF noise coupled to the wire pair must be attenuated so as not to interfere with the detection of the differential data. It is sometimes desirable to provide DC isolation of the PHY using a transformer to protect the PHY against DC shorts and other conditions, but this adds an additional component and increases size and cost. It is desirable to provide such features without undue loading that would adversely affect the signal integrity of the differential data. It is also desirable to minimize the component count for cost and size.

What is needed is an improved termination circuit in a PoDL system employing DC isolation of the PHY using a transformer, where the circuit has a low-component count for reducing size and cost, low loading on the PHY, low differential data insertion loss, high common mode noise insertion loss, and high differential mode return loss.

SUMMARY

Various improved termination techniques for a PoDL system are described.

In one embodiment, the PHY is AC coupled to the wire pair using capacitors. A primary winding of an isolation transformer is coupled across the capacitors for the differential data transmission and reception between PHYs.

A positive terminal of a DC power supply is coupled to one end of a first secondary winding, and the other end of the first secondary winding is coupled to one of the wires in the wire pair.

A negative terminal of the DC power supply is coupled to one end of a second secondary winding and the other end of this second secondary winding is coupled to other one of the wires in the wire pair. The power supply is thus connected such that DC current is injected on one wire and returned on the other wire to power equipment connected to the other end of the wire pair. This can be considered a split center tap of the secondary windings.

Therefore, the power supply conducts DC current through the secondary windings, while the differential data signals also flow through the secondary windings, generating a corresponding differential data signal at the inputs to the PHY. Conversely, transmission from the PHY causes the AC current through the primary winding to generate a differential voltage in the secondary windings that is transmitted by the wire pair.

The power supply provides a low impedance between its positive and negative terminals so there is low differential mode impedance between the split center tap connections of the transformer.

A common mode choke (CMC) is connected in series between the wires in the wire pair and the secondary windings to attenuate common mode RF noise on the wire pair. In another embodiment, the CMC is located between the primary winding of the isolation transformer and the PHY. In another embodiment, the CMC is eliminated if the isolation transformer adequately attenuates common mode RF noise.

An RC termination circuit is also coupled between the wire pair and ground for attenuating noise and providing a suitable termination impedance to minimize reflections.

The disclosed circuits make multi-use of the isolation transformer by providing DC coupling to the wire pair while the power supply provides a low impedance between its terminals for efficiently conducting the differential signals through the respective secondary windings, and while shunting common mode signals at the secondary terminals of the transformer. Thus, the CMC may be optional. As a result, there is a low component count while there is low loading on the PHY, low differential data insertion loss, high common mode noise insertion loss, and high differential mode return loss.

The DC power supply is part of the Power Sourcing Equipment (PSE) side the PoDL system. The other end of the wire pair is coupled to a Powered Device (PD), which may also include a CMC, RC termination, and an isolation transformer. The secondary windings of the PD isolation transformer may have ends coupled between the differential signals and ground, or coupled to ground via a low impedance path in a PD load, since no power supply is used in the PD.

BRIEF DESCRIPTION OF THE DRAWINGS

FIG. 4 is a second variation of the PSE of FIG. 2.
FIG. 5 is a third variation of the PSE of FIG. 2.

DETAILED DESCRIPTION

Five embodiments of a termination circuit in a PSE are described which DC-isolate the PHY from the remainder of the system, DC-couple a power supply to a wire pair, attenuate RF common mode noise on the wire pair, and provide excellent insertion and return losses, while having a low component count.

Figure 1:
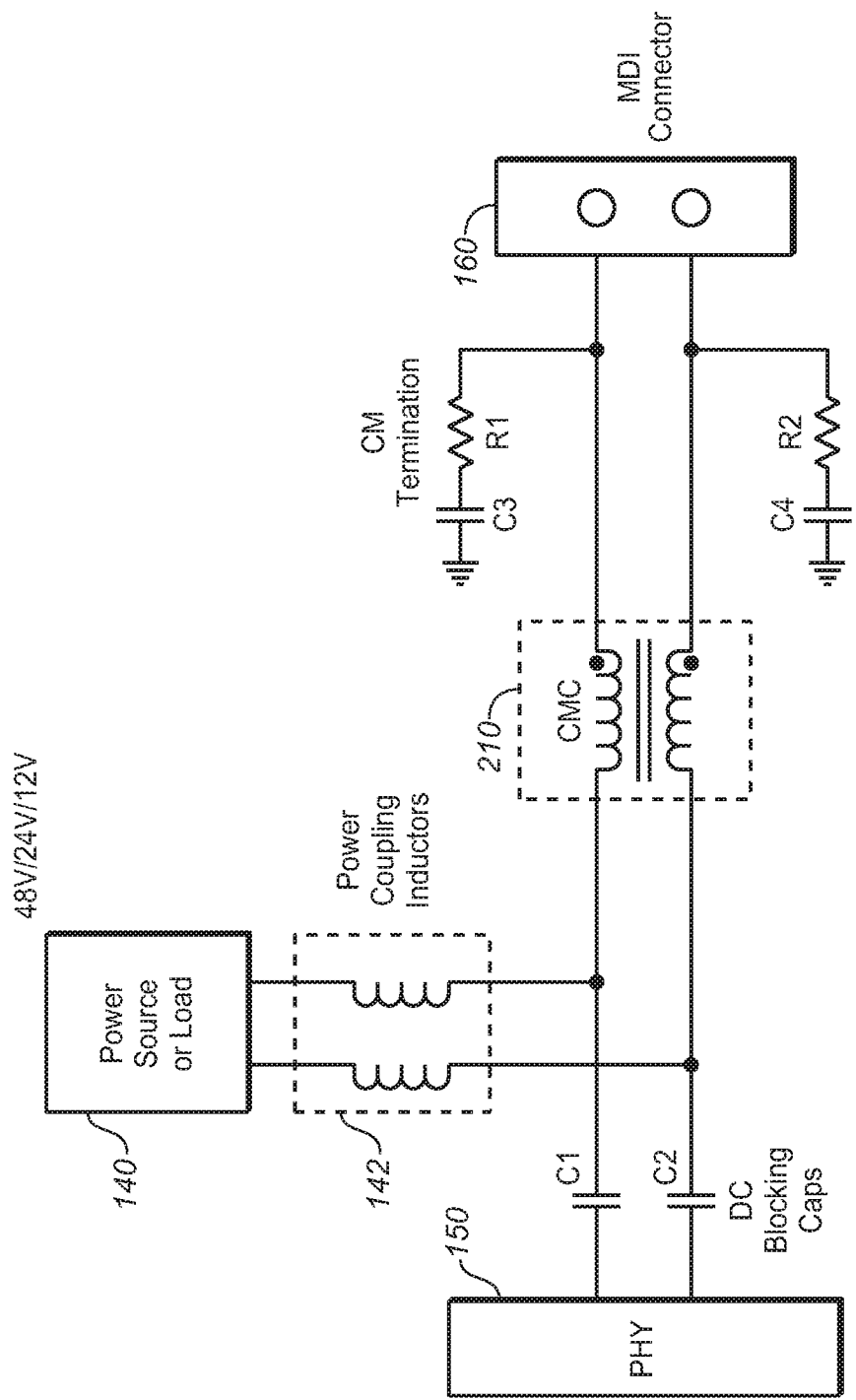
FIG. 1 illustrates a prior art PoDL system.
Figure 2:
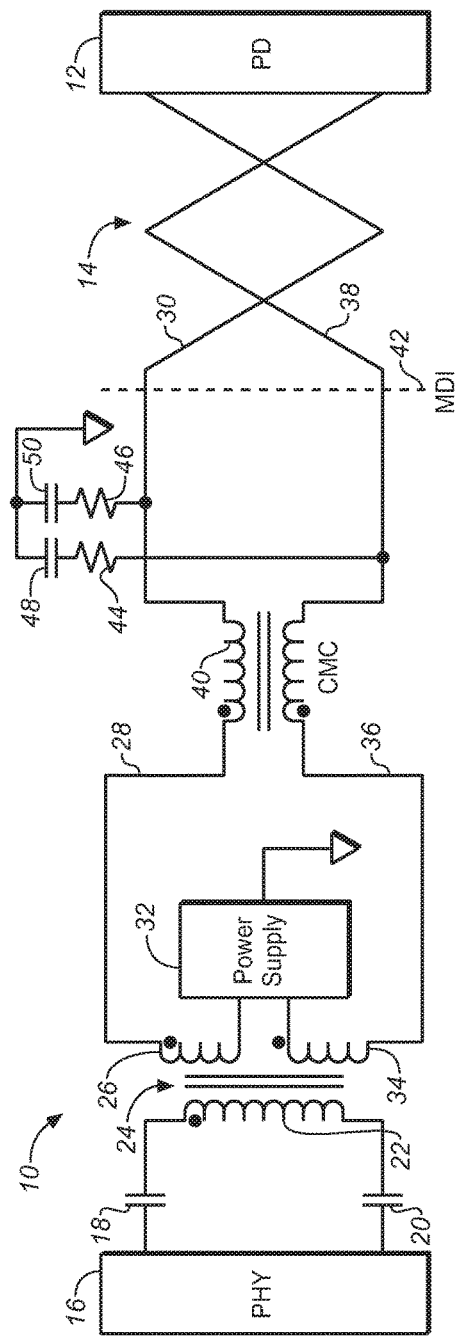
FIG. 2 illustrates a first embodiment of a PSE in a PoDL system using an isolation transformer to DC-couple a power supply to the wire pair, provide a low impedance-to-ground termination of secondary windings coupled to conduct the differential signals, and also attenuate common mode noise signals.

In FIG. 2, Power Sourcing Equipment (PSE) 10 supplies DC power to a Powered Device (PD) 12 via a twisted wire pair 14. The PSE 10 and PD 12 also communicate using differential data, such as Ethernet data.

A PHY 16 in the PSE 10 represents the physical layer in the OSI model and comprises a transceiver that typically includes signal conditioning and decoding circuitry for presenting bits to the next stage. The term PHY is a term of art and is defined by various IEEE standards, depending on the particular application. The PHY 16 is typically an integrated circuit. A digital processor (not shown) is coupled to the PHY 16 for processing the data.

AC-coupling capacitors 18 and 20, at the input/output ports of the PHY 16, do not attenuate the differential data but block DC.

The other ends of the capacitors 18 and 20 are coupled across a primary winding 22 of an isolation transformer 24. A first secondary winding 26 has one end coupled to a conductor 28 which receives and transmits data signals via the wire 30 in the wire pair 14. The other end of the first secondary winding 26 is coupled to a positive voltage terminal of the DC power supply 32. The power supply 32 has a low impedance between its positive and negative terminals so there is a high differential mode return loss and a low differential mode insertion loss.

A second secondary winding 34 has one end coupled to a conductor 36 which receives and transmits data signals via the wire 38 in the wire pair 14. The other end of the second secondary winding 34 is coupled to a negative voltage terminal of the DC power supply 32. The positive and negative outputs of the power supply 32 are just relative terms, and the negative voltage may be a system ground.

Note the relative polarities of the various windings by the dot positions. The dots are on opposite ends of the two secondary windings, causing common mode noise on the wires 28 and 36 to be attenuated while not attenuating differential data signals.

Thus, a differential data signal on the wire pair 14 causes respective currents to flow through the secondary windings 26 and 34 to induce a differential voltage across the primary winding 22 for detection by the PHY 16. The opposite occurs when the PHY 16 transmits differential data.

A common mode choke (CMC) 40 is connected in series between the secondary windings 26 and 34 and the wire pair 14. The CMC 40 is an in-line transformer with two windings in series with the twisted wire pair 14. As shown by the dots on the CMC windings, the windings have the same polarity, so the magnetic field generated by a differential mode signal is substantially cancelled out. Thus, the CMC 40 presents little inductance or impedance to differential mode currents. Common mode currents, however, see a high impedance due to the combined inductance of the windings. The CMC 40 ideally eliminates or greatly attenuates common mode RF noise while providing no loss for the differential or DC voltage signals. However, since the transformer 24 also attenuates common mode noise, the CMC 40 may be optional.

A media dependent interface (MDI) connector 42 is coupled to the wire pair 14. The wires from the MDI connector 42 are terminated by resistors 44 and 46 and capacitors 48 and 50 to minimize reflections.

It is common in a PoDL system for a DC power supply to be coupled to the wire pair via a series-connected differential mode choke (DMC). A DMC has windings with opposite polarities (dots on opposite ends) and attenuates differential signals while not attenuating common mode signals or DC power. Such a DMC is not used in the present invention since the isolation transformer 24 is used to couple the DC power supply 32 to the wire pair 14, as well as conduct the differential data signals. Thus, the isolation transformer 24 provides a DC isolation function for the PHY 16 while conducting the AC differential data signals, while also providing the DC coupling function for the power supply 32. Further, as shown later, the isolation transformer 24 may obviate the need for the CMC 40.

The PD 12 may be coupled to the wire pair 14 with a similar termination system, but the ends of the secondary windings in the PD isolation transformer may be directly coupled to a PD load with a low impedance to system ground. Alternatively, the ends of the secondary windings may be coupled to ground, and the PD load receives DC power from the wire pair 14 via DC-coupling inductors. The PD 12 is fully powered by the DC power from the power supply 32.

Some benefits of the circuit of FIG. 2 include:
1. The configuration effectively causes the isolation transformer to include a differential mode choke (DMC) function (to DC-couple the power supply to the wire pair), thus reducing component count for PoDL applications requiring transformer isolation for the PHY.
2. The transformer configuration provides a low impedance shunt effect for common mode noise signals (obviating the need for a CMC) thus reducing component count and offering better component utilization.
3. The common mode shunt effect reduces the common mode insertion loss requirement of the CMC which, in turn, reduces the open circuit inductance (OCL) requirement.
4. By eliminating the differential mode load of a separate DMC on the PHY, a transformer with the minimum OCL can be used. This relaxes the turns and core size requirements of the transformer.
5. The transformer also offers a high common mode insertion loss which works in conjunction with the common mode shunt of the secondary windings and the common mode insertion loss of the CMC to further reduce the requirements of the CMC.
6. With a large enough common mode insertion loss of the transformer (by reducing parasitics such as interwinding capacitance between primary and secondary windings), the in-line CMC can be eliminated (as shown in FIG. 4).

Other benefits exist.

Figure 3:
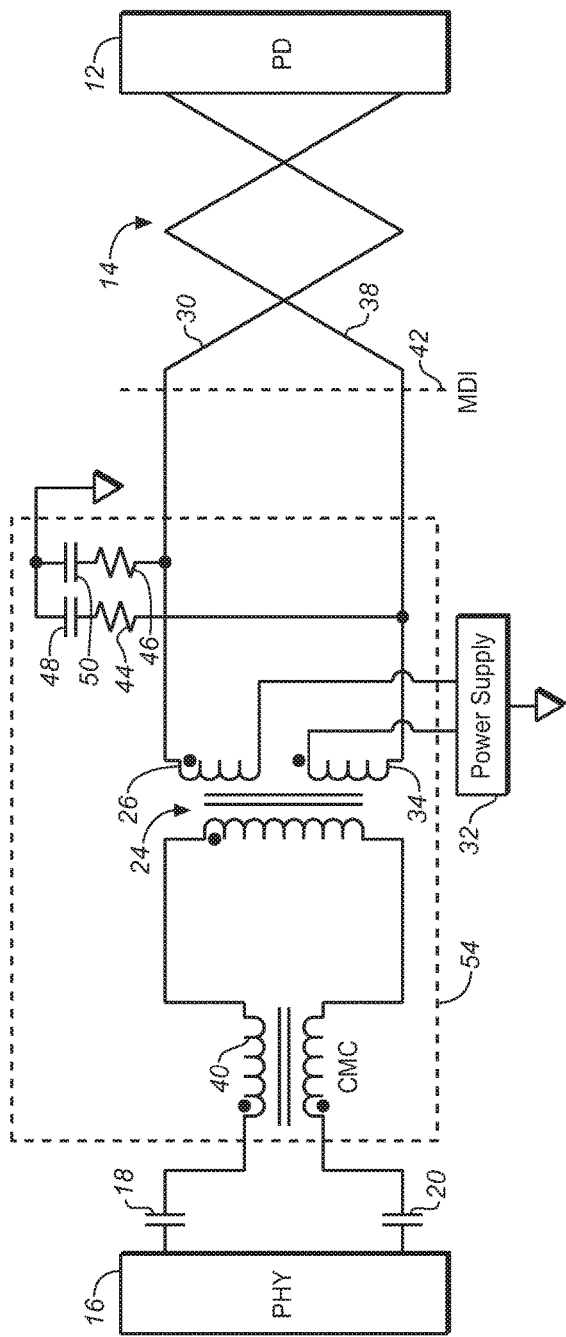
FIG. 3 is a first variation of the PSE of FIG. 2.

FIG. 3 is similar to FIG. 2 except that the CMC 40 is moved to the PHY side of the transformer 24. All the termination components within the box 54 may be integrated in the same package with the MDI connector 42 to minimize the component count, size, and cost. This applies as well to the components in FIG. 2.

FIG. 4 is similar to FIG. 2 except that the CMC 40 is deleted since the transformer 24 adequately attenuates common mode RF noise. All the termination components in box 56 may be integrated. The common mode termination components may no longer be relevant since the common mode impedance of the transformer 24 is very low.

In FIG. 5, the CMC 40 is added between the two secondary terminals 26 and 34 and the power supply terminals, and a capacitor 60 is added between the two secondary windings 26/34 in order to preserve the low differential mode impedance. The termination resistors and capacitors are now merged into one RC termination 62 and connected to one of the secondary windings 34. The CMC 40 in the path of the power supply 32 provides a high common mode impedance and preserves the effect of the common mode termination. In an alternative embodiment, the CMC 40 can be replaced by two discrete inductors. The components in the box 64 can be integrated into an MDI connector as with previous cases. Also, the AC coupling capacitors between the PHY and primary have been removed in this embodiment since the transformer 24 adequately blocks DC voltage from the PHY 16.

Figure 6:
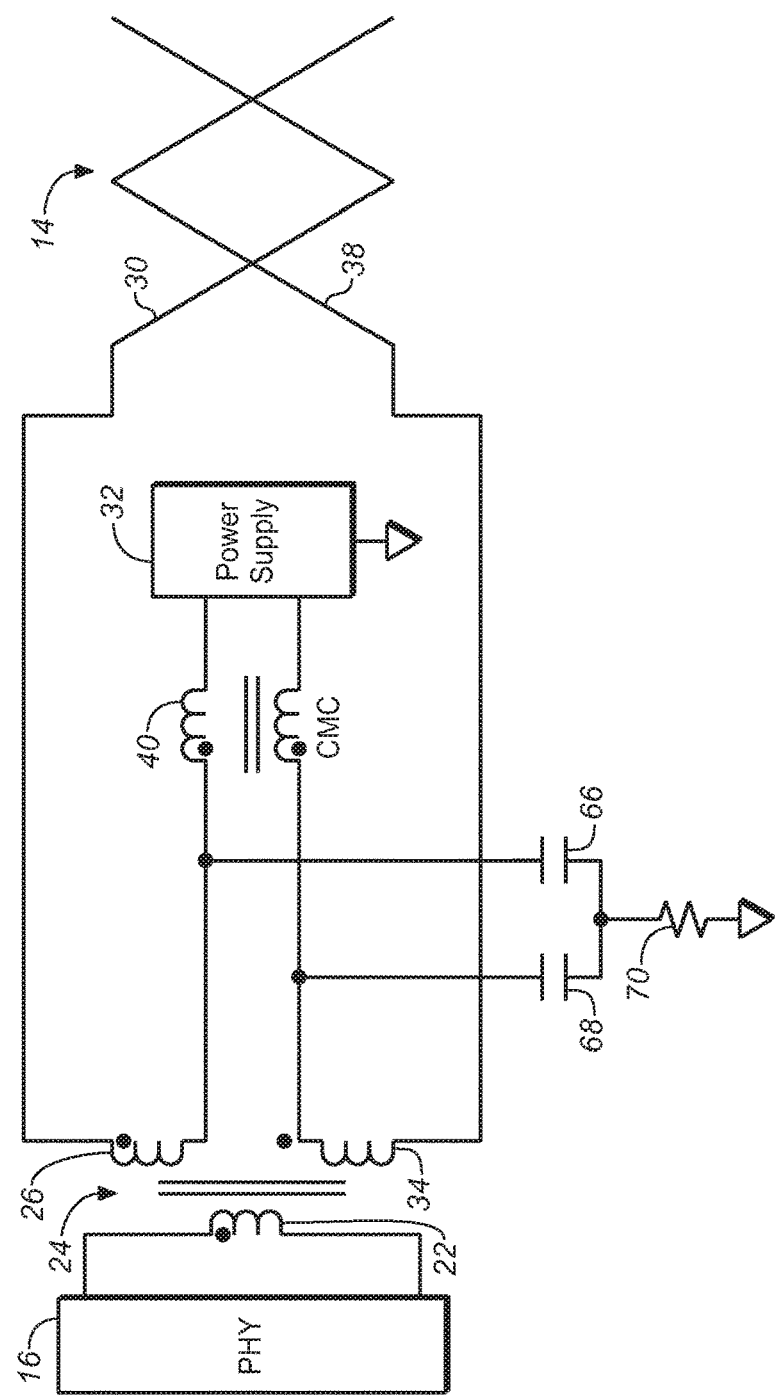
FIG. 6 is a fourth variation of the PSE of FIG. 2.

FIG. 6 is similar to FIG. 5 except for the RC termination. In FIG. 5, there is a chance that a common mode signal passes through a different impedance on each path. This will introduce a differential mode signal (mode conversion) resulting in imbalance between the two lines. FIG. 6 uses a capacitive divider, comprising capacitors 66 and 68 coupled to the secondary windings 26 and 34, in series with a resistor 70 coupled to ground (or other reference voltage). This balanced configuration prevents mode conversion. The RC termination circuit of FIG. 6 may be used with any of the other configuration described herein instead of the RC terminations shown in FIGS. 2-5.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A power and communication system for providing differential data and DC power on a wire pair comprising:
    a DC power supply having a positive voltage terminal and a negative voltage terminal;
    an isolation transformer having a primary winding, a first secondary winding, and a second secondary winding, wherein the positive voltage terminal of the power supply is coupled to a first end of the first secondary winding, and wherein the negative voltage terminal of the power supply is coupled to a first end of the second secondary winding, wherein the first end of the first secondary winding and the first end of the second secondary winding form a split center tap of a secondary side of the transformer; and
    a transceiver coupled across the primary winding for transmitting and receiving differential data signals via the transformer and the wire pair,
    wherein a second end of the first secondary winding is configured to be coupled to a first wire of the wire pair, and a second end of the second secondary winding is configured to be coupled to a second wire of the wire pair, such that the first secondary winding and the second secondary winding conduct DC power to the wire pair and also conduct differential data signals.

2. The system of claim 1 wherein a common mode choke (CMC) or pair of matched inductors is in series between the power supply terminals and the first and second secondary windings of the transformer.

3. The system of claim 1 further comprising:
    an RC termination circuit coupled between the power supply and the secondary side of the transformer, the RC termination circuit comprising:
        a resistor having a first end coupled to a reference voltage;
        a first capacitor coupled between the first end of the first secondary winding and a second end of the resistor; and
        a second capacitor coupled between the first end of the second secondary winding and the second end of the resistor.

4. The system of claim 1 wherein the transceiver comprises a PHY coupled to the primary winding.

5. The system of claim 1 wherein the power supply has a low impedance between the positive voltage terminal and the negative voltage terminal.

6. The system of claim 1 wherein no common mode choke (CMC) is coupled to the wire pair.

7. The system of claim 1 further comprising a powered device coupled to the wire pair for receiving the DC power from the power supply and the differential data signals from the transceiver.

8. The system of claim 1 wherein the transceiver is coupled to the primary winding of the isolation transformer without any AC-coupling capacitors coupled between the primary winding and the transceiver.

9. The system of claim 1 wherein the transformer attenuates common mode noise.

10. The system of claim 1 further comprising:
    a common mode choke (CMC) connected to the first secondary winding and the second secondary winding; and
    a first capacitor coupled across terminals of the CMC.

11. The system of claim 4 wherein the PHY is coupled to the primary winding via a first capacitor in series between one end of the primary winding and the PHY, and a second capacitor in series between another end of the primary winding and the PHY.

12. The system of claim 4 further comprising a common mode choke (CMC) between the primary winding and the PHY.

13. The system of claim 4 further comprising a common mode choke (CMC) between the transformer and the wire pair.

14. The system of claim 5 wherein the negative voltage terminal is coupled to ground.

15. The system of claim 10 further comprising an RC termination network coupled to one of the terminals of the CMC.

16. A method performed by a power and communication system for providing differential data and DC power on a wire pair comprising:
supplying DC power supply, wherein a positive voltage terminal of the power supply is coupled to a first end of a first secondary winding of an isolation transformer, and wherein a negative voltage terminal of the power supply is coupled to a first end of a second secondary winding of the transformer, the transformer also having a primary winding;
conducting DC power from the power supply to the wire pair, via the first secondary winding and the second secondary winding, wherein a first wire of the wire pair is coupled to a second end of the first secondary winding, and a second wire of the wire pair is coupled to a second end of the second secondary winding;
generating differential data signals by a PHY coupled across the primary winding to cause the transformer to conduct the differential data signals on the first secondary winding and the second secondary winding; and
conducting the differential data signals on the wire pair via the transformer,
wherein the transformer performs DC isolation of the PHY, conducts DC power to the wire pair via the first secondary winding and the second secondary winding, and attenuates common mode noise.

17. The method of claim 16 where one of a common mode choke (CMC) and a pair of matched inductors is coupled between the first end of the first secondary winding, the first end of the second secondary winding, and the power supply terminals.

18. The method of claim 16 further comprising additionally attenuating common mode noise via a common mode choke (CMC) coupled in series between the wire pair and the PHY.

19. The method of claim 16 further comprising:
terminating the first end of the first secondary winding with a first capacitor coupled to a first end of a resistor, where a second end of the resistor is coupled to a reference voltage; and
terminating the first end of the second secondary winding with a second capacitor coupled to the first end of a resistor.

20. The method of claim 18 wherein the CMC is between the transformer and the wire pair.

21. The method of claim 18 wherein the CMC is between the transformer and the PHY.

* * * * *